United States Patent

[11] 3,557,312

[72] Inventors Joseph Herbert Vogelman
Roslyn, N.Y.;
Kenrick O. Stephenson, Jr., Montclair,
N.J.; Bernard Feinerman, Suffern, N.Y.

[21] Appl. No. 843,520
[22] Filed July 22, 1969
[45] Patented Jan. 19, 1971
[73] Assignee Chromalloy American Corporation
West Nyack, N.Y.
a corporation of New York
Division of Ser. No. 503,285, Oct. 23, 1965,
Patent No. 3,476,882.

[54] REMOTE TELEPHONE EXTENSION SYSTEM
3 Claims, 8 Drawing Figs.

[52] U.S. Cl. .......... 179/2, 179/41
[51] Int. Cl. .......... H04m 11/00
[50] Field of Search .......... 179/2RC, 41(A), 121; 325/61, 62

[56] References Cited

UNITED STATES PATENTS 2,314,707 3/1943 Katzin .......... 325/61
2,528,636 11/1950 Cisin .......... 179/1X(C)
3,254,159 5/1966 Condict .......... 179/41(A)

*Primary Examiner*—Ralph D. Blakeslee
*Attorney*—Curtis, Morris & Safford

ABSTRACT: The system allows one to answer his telephone and talk to the caller by means of a remote transceiver which is carried by the person when he is away from his telephone. A base station unit develops and transmits to the transceiver a ringing signal to alert the person that his telephone is ringing. The transceiver is operated to transmit an answering signal which has both a frequency-coded component and a speech-modulated component to answer the telephone. Amplitude comparison and timing circuits are used, together with a frequency analyzer to prevent unwanted answering of the telephone. Means are provided for terminating the call in response to either hanging up the calling telephone, receipt of a dial tone, or receipt of a warning signal on the telephone after hang-up. Also, means are provided for automatic hang-up after a period of time in which no coded signal from the remote transceiver or voice signals from the caller are received. Remote dialing means are provided in which the answering circuitry is used in the initiation of calls from the remote transceiver, as well as in the answering of incoming calls.

INVENTORS
Joseph Herbert Vogelman
Kenrick O. Stephenson, JR
BY Bernard Feinerman
Curtis, Morris & Safford
ATTORNEYS

REMOTE TELEPHONE EXTENSION SYSTEM

This application is a division of application Ser. No. 503,285 filed Oct. 23, 1965 now U.S. Pat. No. 3,476,882.

The present invention relates in general to communication systems and more particularly to a telephone extension system employing a wireless radio frequency link between a base station at which a conventional telephone is located and a remote station. The remote station unit, being portable, permits an individual to carry the unit and thereby enables this individual to use his telephone at points distant from his telephone.

Land-line telephone systems require fixed installation stations. Wired telephone extensions have been used extensively by subscribers wishing to make or receive calls at points remote from their base stations.

A number of radio frequency telephone extension links have been proposed in the past. Generally, in these systems, a base station transmitter-receiver is coupled, either directly or inductively, to the telephone located at the base station. The ringing of an incoming call is sensed and transmitted to a remote station unit which is a portable transmitter-receiver. The individual at the remote station, after being aroused by the ringing or equivalent audible sound, responds and transmits an answer. The answer or response signal received at the base station is used to "answer" the telephone either by physically lifting the handset off of the handset buttons or by electrically connecting a suitable impedance termination across the telephone lines to simulate an answering of the telephone. From this point on, the calling and called parties are in direct communication as if the called party were physically at his telephone. After the conversation is terminated, the system is "hung-up" automatically by control signals developed either in response to the action of the calling party hanging up or by the action of the called party in ceasing to transmit an answer signal.

Each of the various radio frequency telephone extension links proposed in the past falls short of providing the desired flexibility, versatility and fool-proof operation necessary for present day communications. For example, on one system, the telephone is "answered" in response to the reception of a voice signal from the remote station. Since environmental electrical noise sometimes has an appearance similar to a voice signal, electrical noise may inadvertently "answer" the telephone in this system. A similar problem is apt to arise if the radio frequency carrier signal transmitted from the remote station is used to "answer" the telephone since noise sometimes has an appearance similar to a carrier signal. In another system, the "hang-up" of the called telephone is effected solely by the action or lack of action of the party at the remote station. This system is lacking in that "hang-up" of the called telephone should at least occur when the calling party hangs up and preferably is controlled from both the calling telephone and the remote station.

Accordingly, it is an object of the present invention to provide a new and improved telephone extension system for linking a telephone at a base station to a remote station.

A feature of the present invention is that the telephone extension link may be directly connected to the telephone circuitry in those areas where such connections are permitted, or alternatively, may be coupled to the base station telephone by means other than a direct connection.

It is another object of the present invention to provide a telephone extension link which provides the flexibility, versatility and fool-proof operation necessary for present day communications systems and which does not suffer from the particular shortcomings and limitations of similar present day systems.

It is a further object of the present invention to provide a telephone extension link which is relatively simple in construction and operation and inexpensive to fabricate.

The telephone extension system disclosed herein for linking a telephone located at a base station to a remote station includes means for developing a ring signal in response to the ringing of an incoming call to the base station telephone from a calling telephone, a speech signal representative of the speech of the incoming call and a hang-up signal after the incoming call is terminated. This system also includes base station transmitting and receiving means for transmitting the ring and speech signals to the remote station and for receiving signals transmitted from the remote station. Also included in this telephone extension system are remote station transmitting and receiving means for receiving signals transmitted from the base station and for transmitting an answer signal having a coded component and a speech modulated component. The telephone extension system further includes control means responsive to the coded component of the answer signal for placing an impedance termination across the lines of the base station telephone to couple the speech of the incoming call to the base station transmitting and receiving means and for coupling the speech of the speech modulated component of the answer signal to the base station telephone. The control means are further responsive to the hang-up signal for removing the impedance termination from the base station telephone lines at the termination of the incoming call.

In one form of the invention, the party at the remote station can simply receive and respond to an incoming call to his base station telephone. In another form of the invention, the party at the remote station can initiate a call by arousing a switchboard operator who places the call, while in still a third form of the invention, the party at the remote station can initiate a call by dialing it himself.

For a better understanding of the present invention, together with other and further objects thereof, reference is made to the following description, taken in connection with accompanying drawings, and its scope will be pointed out in the appended claims.

Referring to the drawings.

Figure 1:
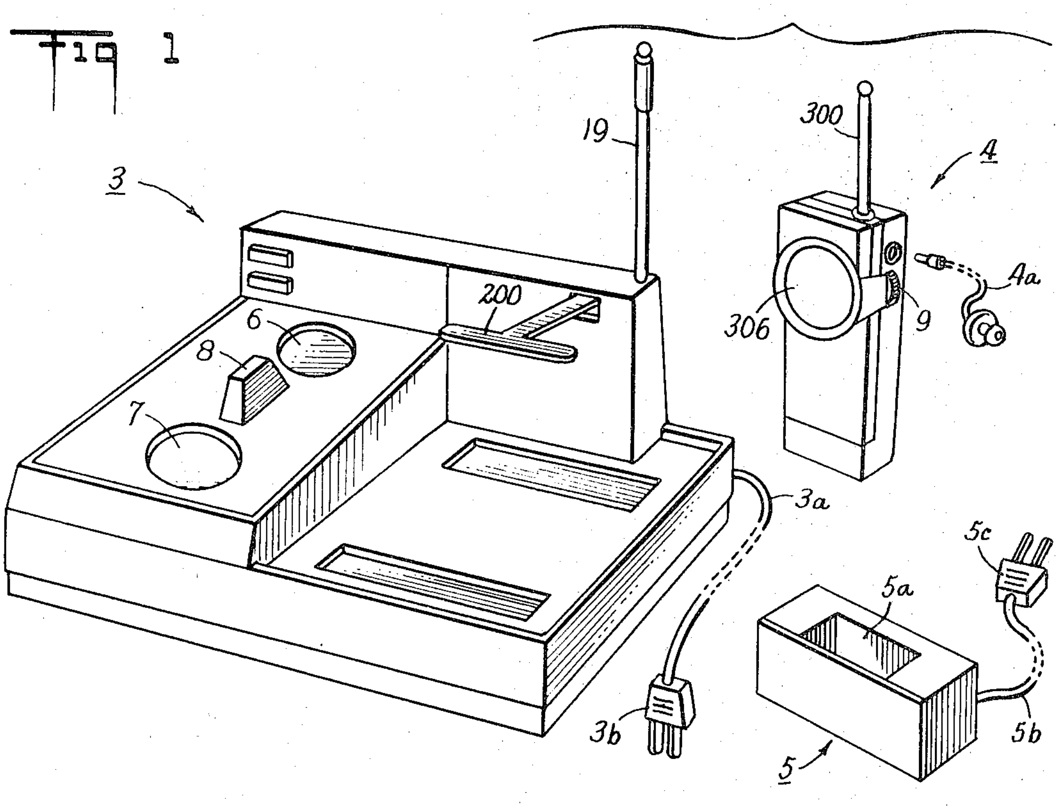
FIG. 1 shows one embodiment of a telephone extension system constructed in accordance with the present invention.
Figure 6:
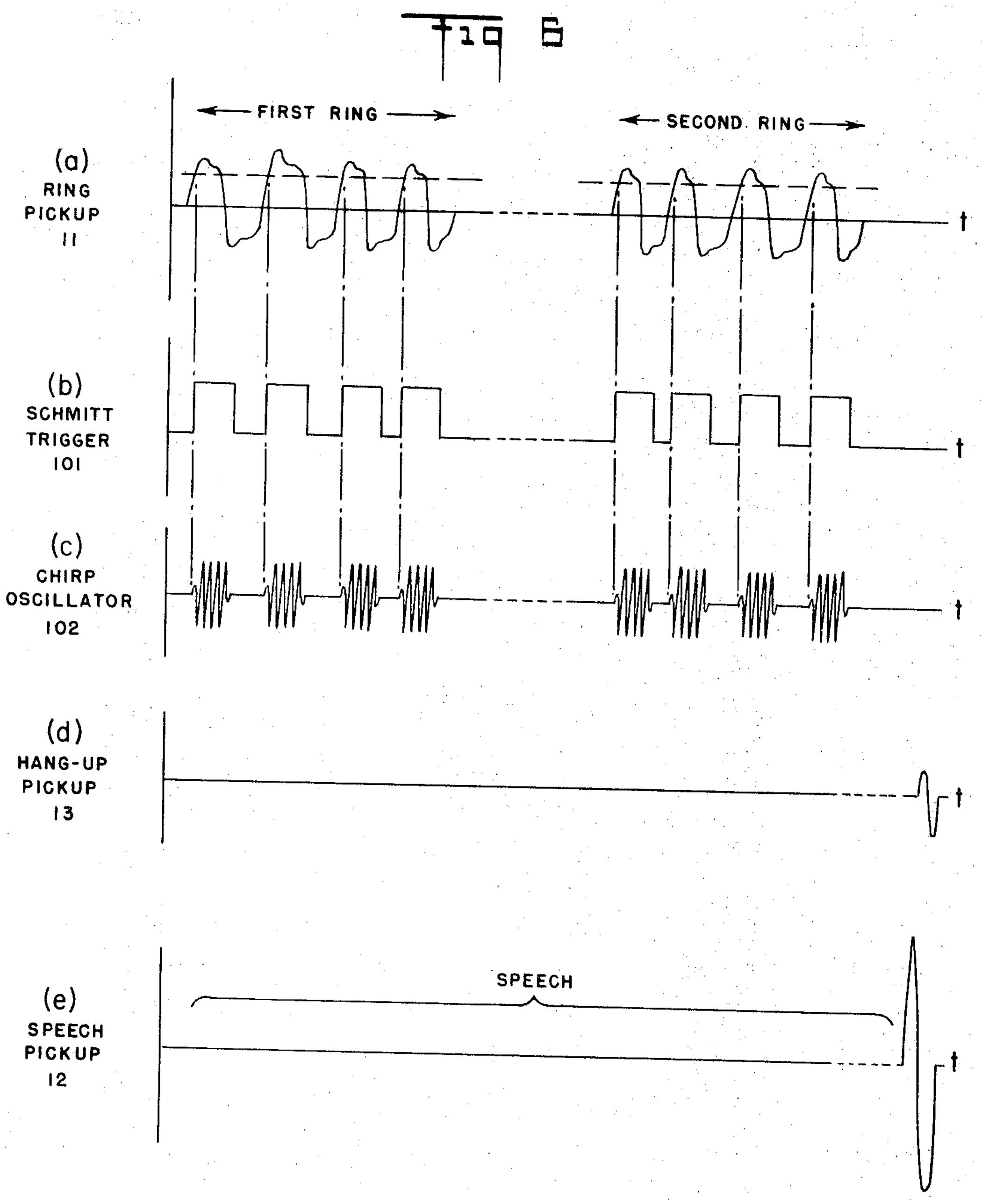
Figure 7:
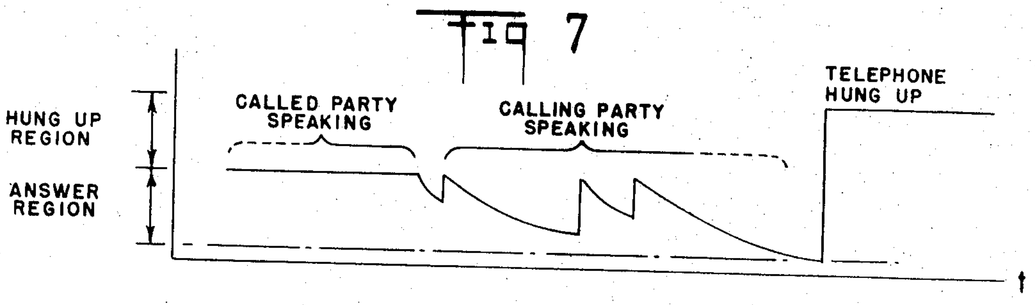

FIGS. *5a* and *5b* are block diagrams of the base station unit of the FIG. 1 system;

FIG. 6 shows waveforms which are helpful in understanding the operation of the base station unit of FIGS. *5a* and *5b*; and FIG. 7 shows a waveform which is helpful in understanding the operation of a modification to the base station unit of FIGS. *5a* and *5b*.

THE OVERALL SYSTEM AND ITS OPERATION

Referring to FIG. 1, a telephone extension system constructed in accordance with the present invention includes a base station unit designated generally by reference numeral 3 and a remote station unit designated generally by reference numeral 4. The base station unit 3 includes a transmitter-receiver along with suitable electronic and mechanical switching equipment for coupling a telephone at the base station to the transmitter-receiver. The base station unit 3 is connected to the power lines by means of a wire *3a* and a plug *3b*. The transmitter-receiver transmits the ringing and speech of an incoming call to the base station telephone to a remote station and receives an answer from the remote station unit 4 which is coupled to the base station telephone so as to put the calling party and a party at the remote station in direct contact with each other.

The remote station unit 4 also includes a transmitter-receiver. Since the remote station unit 4 is preferably battery operated thereby permitting its use where connection to power lines is not possible, a battery charger 5 of conventional construction and operation may also be provided. When the telephone extension system of the invention is not in use, the remote station unit 4 is inserted into the receiving well *5a* for the battery charger 5 so as to recharge the batteries for subsequent use. The battery charger 5 is normally kept at the same location as the base station unit 3 and is connected to the power lines by means of a wire 5b and a plug 5c. An ear phone 4a is provided with the remote station unit 4 to provide privacy for the party using the remote station unit.

Figure 2:
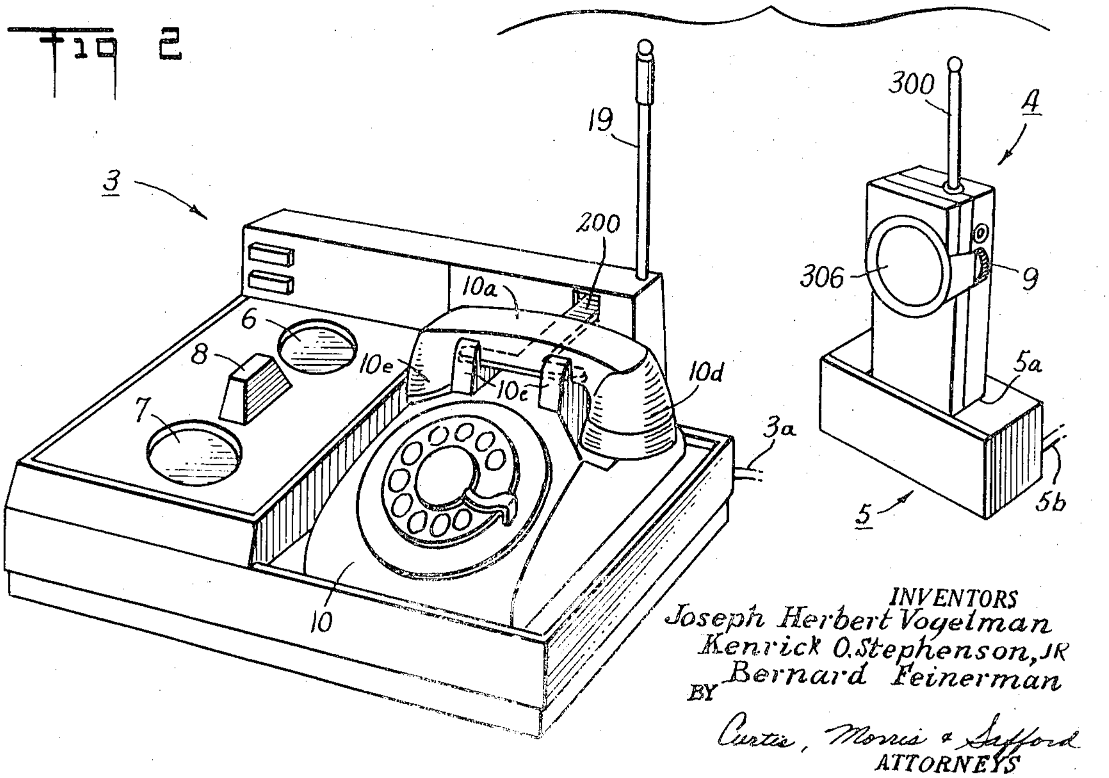
FIG. 2 shows the base station unit of the FIG. 1 system with a base station telephone conditioned for normal use.
Figure 3:
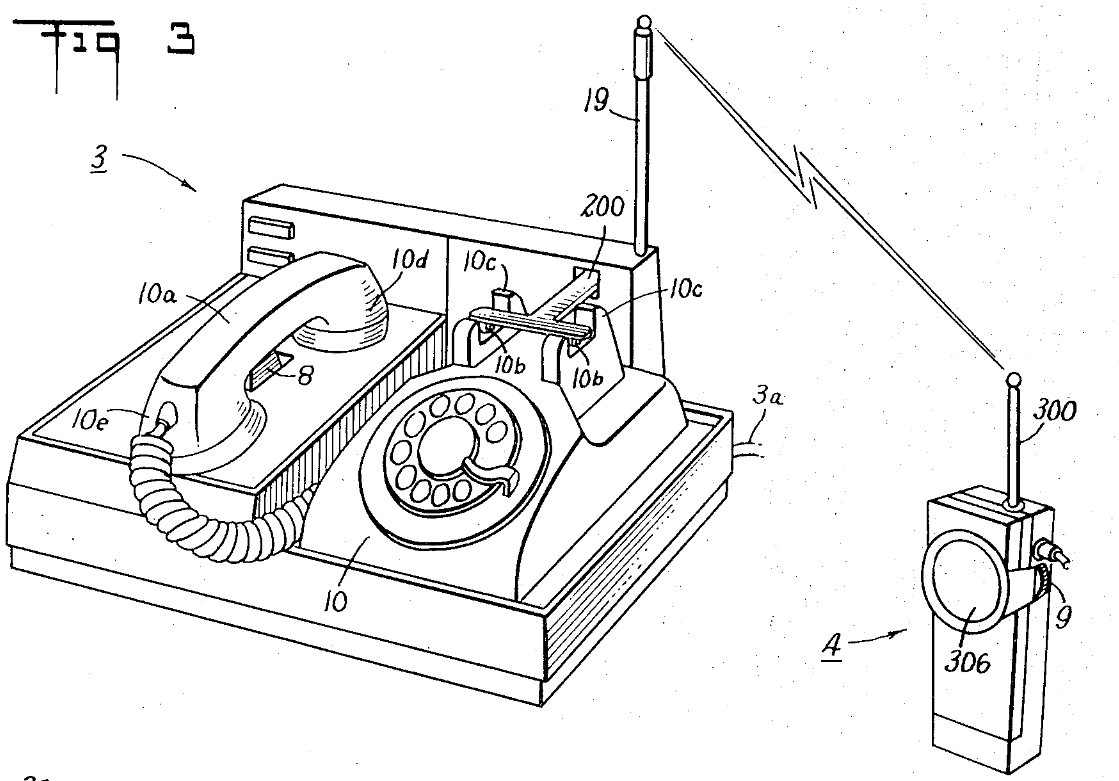
FIG. 3 shows the base station unit of the FIG. 1 system conditioned for linking a base station telephone to a remote station.

FIGS. 2 and 3 illustrate the manner in which a telephone 10 is positioned and located at the base station unit 3. FIG. 2 shows the telephone 10 in use in the usual manner with telephone handset 10a resting in the telephone cradle 10c. The handset 10a rests upon a pivotally mounted paddle 200 which projects from a wall of the base station unit 3. The weight of the telephone handset 10a upon the paddle 200 causes the handset buttons (not shown) to be depressed so that the telephone 10 is hung-up and ready for the reception of an incoming call. When an incoming call is received or a party wishes to place a call, the handset 10a is lifted. This permits the paddle 200 to rise, in turn permitting the handset buttons to rise and connect the telephone into the circuit in the usual manner.

FIG. 3 shows the base station unit 3 conditioned for transmitting an incoming call to the base station telephone 10 to the remote station unit 4 and for receiving a response from the remote station and coupling the response to the base station telephone. The handset 10a is removed from the cradle 10c and set into a pair of receptacles 6 and 7. Receptacle 6 serves to receive the handset earpiece 10d to sense the speech of an incoming call, while the receptacle 7 serves to couple the speech of an answer from the remote station unit 4 to the telephone mouthpiece 10e. As the handset 10a is inserted into the receptacles 6 and 7, a switching element 8 is depressed and, through a suitable mechanism to be described in more detail below, causes the paddle 200 to move downward to depress the handset buttons. The base station telephone 10 is again conditioned to receive an incoming call.

When an incoming call is received by the base station telephone 10, the ringing of the call is sensed by a pickup device which develops a signal for transmission from an antenna 19 to the remote station. By utilizing an electromagnetic or electrostatic pickup, direct connections to the telephone circuit are avoided. It is necessary to employ such devices in areas where the telephone companies prohibit physical connections to the existing circuitry.

Upon reception of the ring signal by an antenna 300 on the remote station unit 4, the party at the remote station is aroused to the fact that a call has been placed to his telephone at the base station by sound emanating from a microphone-loudspeaker 306 on the remote station unit. This party may answer by pressing a "push-to-talk" button 9 on the remote station unit 4 and speaking into the microphone-loudspeaker 306. The answer is transmitted with a distinct coded component which provides exclusivity to the system. Upon reception of the response at the base station unit 3, the coded component is analyzed and if it is the proper code, a control signal is developed which drives the paddle 200 upward thereby permitting the handset buttons to rise. Telephone 10 is, in this manner, answered automatically from the remote station. From this point on, the party at the calling telephone and the party at the remote station are in direct contact with each other.

After the conversation is terminated and the calling telephone is hung-up, another control signal is developed. This control signal drives the paddle 200 downward thereby depressing the handset buttons and the telephone 10 is, in this manner, hung-up.

SIGNALING AN INCOMING CALL

Figure 4:
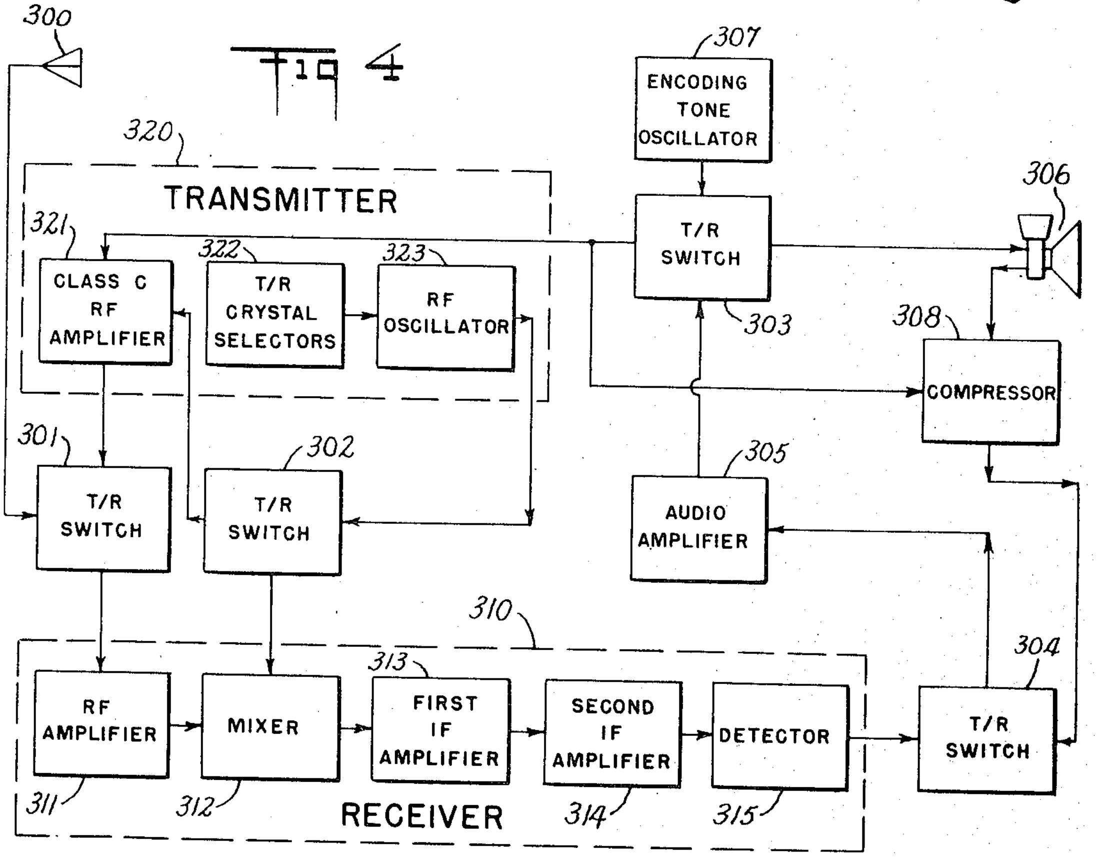
FIG. 4 is a block diagram of the remote station unit of the FIG. 1 system.
Figure 5A:
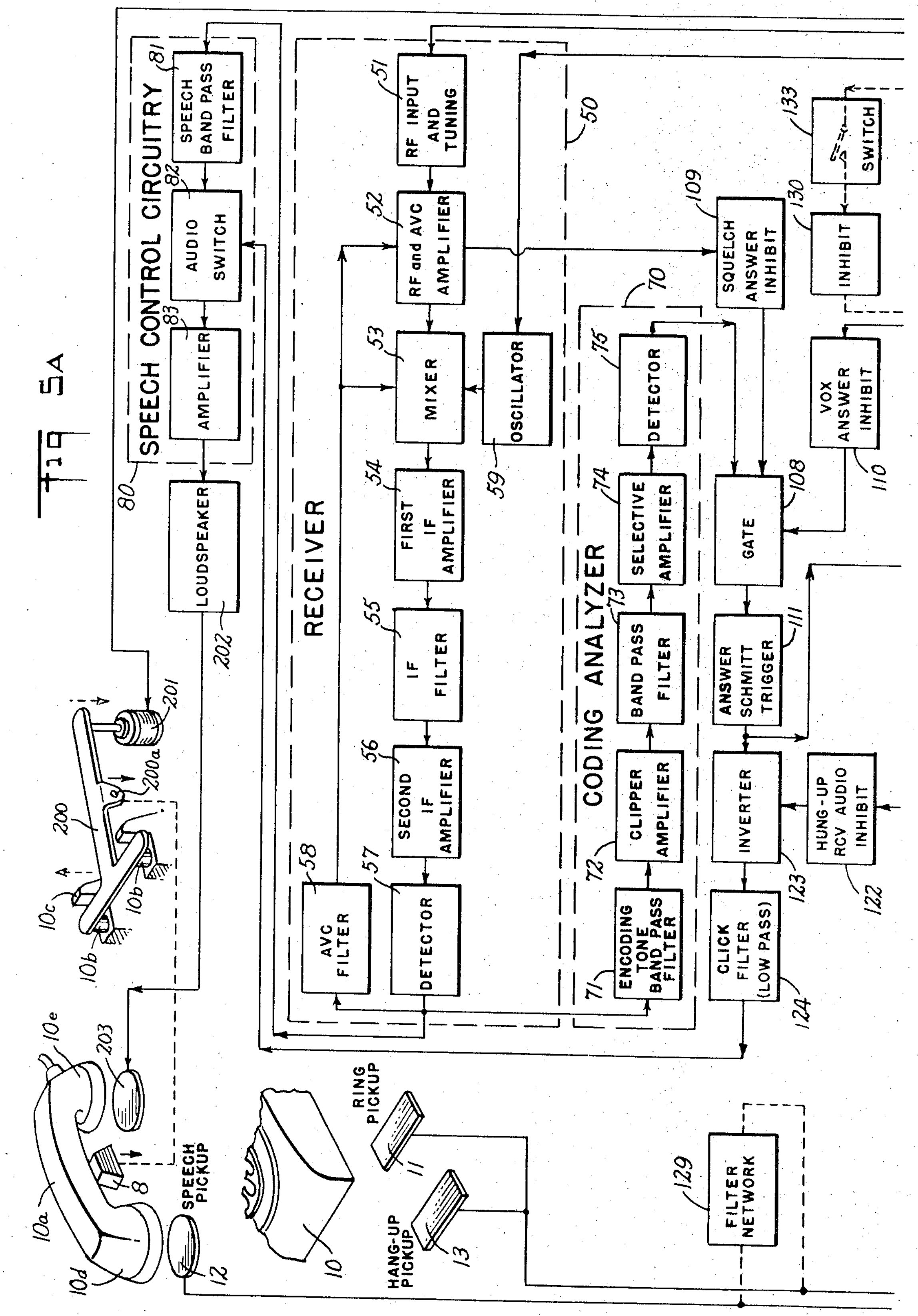
Figure 5B:
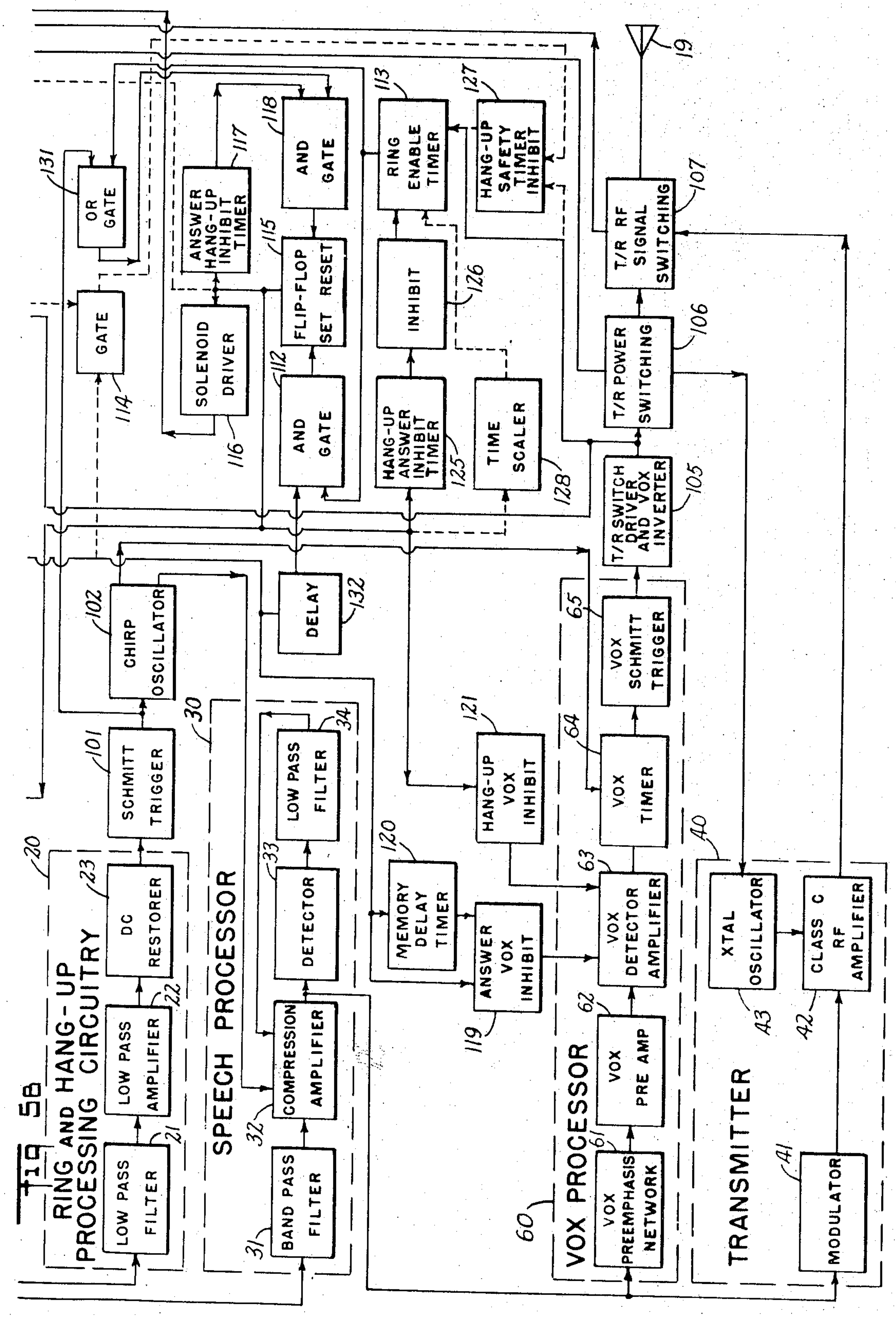

FIGS. 5a and 5b are block diagrams of the base station unit of the telephone extension system of the present invention and show the manner in which the base station unit is coupled to the telephone 10. FIG. 4 is a block diagram of the remote station unit 4 of the system. The operation of the system will be best understood by describing the manner in which the system responds to an actual incoming call and the manner in which a response from the remote station unit 4 is conveyed to the calling party. In this description, all the component circuits will be described in terms of the functions performed. Where a component circuit is of other than conventional construction and operation, a more detailed explanation is provided following the description of the complete system. It should be noted that the various component circuits have been designated by titles descriptive of the functions performed.

The cycle of operation of the system is initiated by the ringing of an incoming call to the telephone 10. Accordingly, means are provided for developing a ring signal in response to the ringing of the incoming call. Such means may include a first pickup device, designated as a ring pickup 11, which may be either an electromagnetic or electrostatic pickup. For the present embodiment of the invention, ring pickup 11 is an electromagnetic pickup placed in close proximity to the bell of telephone 10 and responds to the flux field of the bell solenoid. The signal developed by the ring pickup 11 shown as waveform (a) in FIG. 6 is coupled to a Ring and Hang-Up Processing Circuitry 20 which may include a low pass filter 21, a low pass amplifier 22 and a DC restorer 23, all of conventional construction and operation. The AC signal from the ring pickup 11 creates residual charges on the capacitors in the low pass filter 21. The DC restorer 23 effectively discharges these capacitors and restores the DC levels of the signals from the ring pickup 11 to their original values.

Connected to the output of the DC restorer 23 is a Schmitt trigger circuit 101, of conventional construction and operation, which develops a pulse of fixed characteristics for each cycle of a ring sensed by the ring pickup 11. This is shown as waveform (b) in FIG. 6. The Schmitt trigger circuit 101 is triggered when the signal of waveform (a) reaches a triggering level indicated by the dotted horizontal line in waveform (a). While the durations of each of the pulses developed by the Schmitt trigger circuit 101 are the same; the periods between pulses may vary since the periods of the cycles of a single ring are apt to vary. The output of the Schmitt trigger circuit 101 is connected to a chirp oscillator 102 which develops a series of oscillations for each pulse developed by the Schmitt trigger circuit 101 as shown in waveform (c) in FIG. 6. The duration of each series of oscillations is equal to the duration of each pulse developed by the Schmitt trigger circuit 101. Chirp oscillator 102 may be an oscillator of conventional construction and operation which when turned on by the Schmitt trigger circuit 101 develops a series of audio oscillations. The chirp oscillator 102 is provided to optimize the signal to be transmitter to the remote station to arouse the party at the remote station that a call has been placed to his base station telephone.

The oscillations developed by the chirp oscillator 102 are coupled to a Speech Processor 30 which includes a band-pass filter 31, a compression amplifier 32, a detector 33 and a low pass filter 34, all of conventional construction and operation. The oscillations are coupled to an input to the compression amplifier 32 which bypasses the compression circuitry, so that the oscillations are amplified but not compressed. The output signal from the compression amplifier 32 having its origin at the ring pickup 11 will from this point on be referred to as the ring signal.

The ring signal is coupled to the base station Transmitter 40 which includes a modulator 41, a class C RF amplifier 42 and a crystal oscillator 43, all of conventional construction and operation and arranged in the usual manner. The Transmitter 40 develops a radio frequency signal modulated by the ring signal for transmission to the remote station. This radio frequency signal may be within the Citizens Radio Band which extends from 26.97—27.27 Mc/s.

The base station unit 3 further includes a base station Receiver 50 which includes, in the order named an RF input and tuning circuit 51, an RF and AVC amplifier 52, a mixer 53, a first IF amplifier 54, an IF filter 55, a second IF amplifier 56, a detector 57, an AVC filter 58 and an oscillator 59, all of conventional construction and operation and arranged in the usual manner. The operation of the Receiver 50 will be described in more detail below. The Receiver 50 is mentioned at this point to note that for the particular embodiment of the invention being described base station unit 3 is initially conditioned for receiving signals transmitted from the remote station. Thus, it may be said that initially the Transmitter 40 is off and the Receiver 50 is on.

Accordingly, for such an arrangement, first circuit means are provided which are initially responsive to the ring signal for disabling the Receiver 50 and for enabling the Transmitter 40 to transmit the ring signal. Such means include a VOX (Voice Operated Switch) Processor 60 which includes a VOX preemphasis network 61, a VOX preamplifier 62, a VOX detector amplifier 63, a VOX timer 64 and a VOX Schmitt trigger circuit 65 all of conventional construction and design. The VOX Processor 60, responding to the ring signal, develops at the output of the VOX Schmitt trigger circuit 65 an output signal for each ring. The output from the VOX Schmitt trigger circuit 65 drives a T/R (Transmit/Receive) switch driver and VOX inverter 105 which inverts the VOX Schmitt trigger circuit output signal and conditions a T/R power switching circuit 106 and a T/R RF signal switching circuit 107 for transmitting the ring signal. Specifically the T/R power switching circuit 106 turns off the oscillator 59 in the base station Receiver 50 and turns on the crystal oscillator 43 in the base station Transmitter 40. The T/R RF signal switching circuit 107 couples the output of the base station Transmitter 40 to the antenna 19 and decouples the antenna 19 from the base station Receiver 50. In this manner, the ring signal is transmitted to the remote station. The T/R switch driver and VOX inverter 105 may be a circuit of conventional design including a relay having a pair of switching elements which correspond to the switching circuits 106 and 107.

The VOX detector amplifier 63 is initially inhibited by a hung-up VOX inhibit circuit 121 from providing a signal to the VOX timer 64. This is to prevent low level spurious signals from being transmitted. When the chirp oscillator 102 develops an output signal in response to the sensing of a ring, this output signal is coupled to the VOX timer 64 to trigger the VOX timer. As will be explained below, after an answer is received from the remote station, the inhibiting effect of the hung-up VOX inhibit circuit 121 is removed and the output signal from the VOX detector amplifier 63 triggers the VOX timer 64.

The VOX timer 64 which may be an RC timing circuit of conventional design serves to keep the VOX channel enabled for a finite amount of time after the termination of an input signal to the VOX Processor. This is especially necessary when speech is being processed. Without the VOX timer 64, the VOX channel would turn off between syllables of a word and between words of a sentence. In order to permit syllables to run together into words and to prevent the VOX channel from being turned off between words, the VOX timer 64 is provided to keep the VOX channel active. On the other hand, the VOX timer 64 should permit the VOX channel to turn off during pauses between sentences so that the Receiver 50 may receive a response from the remote station. Thus, a compromise is made in the timing of the VOX timer 64 between providing continuity between syllables of words and permitting responses from the remote station to be received during pauses between sentences.

ANSWERING THE INCOMING CALL

It will be assumed that the transmitted ring signal has been received at the remote station unit 4 and that the party at the remote station has been aroused and has transmitted an answer signal. The answer signal is a radio frequency signal modulated by a coded component accompanied by a speech modulated component. The radio frequency answer signal from the remote station may also be within the Citizens Radio Band. The coded component is to provide the telephone extension system of the invention with exclusivity. Various undesired signals are apt to be received since the Receiver 50 is conditioned to receive signals over a fixed frequency range. These undesired signals may be in the nature of environmental electrical noise or may be transmissions of other systems operating in the Citizens Radio Band. Unless the proper coded signal is received, the base station receiving apparatus, although conditioned to receive signals, should not process the received signals.

One of a number of different coding techniques may be employed to provide the desired exclusivity. For certain applications, the coding preferably involves the generation of a tone signal thus rendering the system frequency selective. For other applications, a pulse coding scheme or one involving a combination of pulse and frequency coding may advantageously be employed. A frequency coding scheme is employed in the embodiment of the invention being described. In particular, a tone signal having a selected frequency either above or below the major region of the speech frequency range (250c.p.s. to 5000c.p.s.), is generated by the remote station unit 4 and amplitude modulates the radio frequency carrier. This code signal is continuously generated and transmitted whenever a radio frequency signal is transmitted from the remote station unit. In a network of systems, each base station unit-remote station unit pair is provided with a unique frequency or code to avoid interference between systems.

The tone signal with the speech modulated component is received at the base station unit 3 by antenna 19 and is coupled to the base station Receiver 50 which is conditioned to receive signals in the intervals between signals being transmitted from the base station unit. This may occur during the intervals between the transmissions of the ring signals. The Receiver 50 processes the answer signal from the remote station unit in the usual manner and provides at the output of the detector 57 a detected signal composed of the tone signal and the speech modulation. If the received tone signal corresponds to the tone to which the system is tuned, an impedance termination is placed across the lines of the telephone 10 and the telephone is answered automatically. Accordingly, means are provided, coupled to the base station Receiver 50, for analyzing the coded component of the answer signal. Such means include a Coding Analyzer 70 having an encoding tone band-pass filter 71, a clipper amplifier 72, a band-pass filter 73, a selective amplifier 74 and a detector 75 all of conventional construction and design. This circuitry is tuned to the particular tone frequency assigned to the system to select the tone signal, while rejecting other signals such as the speech modulated component of the answer signal. If a proper tone signal is received, the Coding Analyzer 70 develops an output signal. Since the tone signal is continuous through the duration of a transmission from the remote station unit, the output signal from the Coding Analyzer 70 is continuous throughout the period that a tone signal is being received. The output signal from the Coding Analyzer 70 is coupled to one input of a gate 108 of conventional construction and operation.

When an answer signal is received by the Receiver 50, the RF and AVC amplifier 52 conditions a squelch answer inhibit circuit 109 in such a manner that it no longer acts as an inhibitor and provides a signal to a second input to the gate 108. The squelch answer inhibit circuit 109 provides a second degree of assurance against false answers in that the presence of a radio frequency signal of proper frequency and amplitude is also necessary in order for the base station receiving apparatus to respond to a received signal. It is quite possible, for example, for an automobile engine to generate a radio frequency signal modulated by a low frequency audio signal of the same frequency as the tone signal and to have this signal received by antenna 19 and inadvertently answer telephone 10. The squelch answer inhibit circuit 109 is a narrow band amplitude selective circuit. Since the level of the radio frequency signal generated by an automobile engine or other undesirable signals is considerably lower than the level of the radio frequency signal transmitted from the remote station unit, such undesirable signals will not remove the inhibiting effect of the squelch answer inhibit circuit 109.

Whenever a signal is being transmitted from the base station unit 3 and the VOX Schmitt trigger circuit 65 is set off, a VOX answer inhibit circuit 110, responsive to the T/R switch driver and VOX inverter 105 is conditioned to provide a signal to the gate 108 which disables the gate and inhibits an answer signal from answering telephone 10. This function is provided to cope with the feedback connection intentionally built into telephone handsets and will be considered in more detail below. After the VOX timer 64 runs out, the VOX Schmitt trigger circuit 65 ceases to provide an output signal and the VOX answer inhibit circuit 110 no longer inhibits the action of the gate 108. Thus, with the proper input signals supplied to the gate 108 from the detector 75, the squelch answer inhibit circuit 109 and the VOX answer inhibit circuit 110, an answer Schmitt trigger circuit 111, of conventional construction and operation and coupled to the output of gate 108, is set off.

The answer Schmitt trigger circuit 111 provides a signal to one input of an AND gate 111 provides a signal to one input 112 (FIG. 5B) of conventional construction and operation through a delay circuit 132 of conventional design and operation. The delay circuit 132 determines the minimum time during which the answer signal from the remote station must be present so as to insure that random noise will not cause an answering of the base station telephone. When the ring signal is originally transmitted the condition of the T/R switch driver and VOX inverter 105 is such that the output signal from the T/R switch driver and VOX inverter sets off a ring enable timer 113. The ring enable timer 113 develops, in response to the signal from the T/R switch driver and VOX inverter 105, an output signal which is supplied to a second input to the AND gate 112. The duration of the output signal from the ring enable timer 113 is set to determine the time during which an answering of the base station telephone 10 may be effected from the remote station. With the presence of two signals at the inputs to the AND gate 112, one from the answer Schmitt trigger circuit 111 and another from the ring enable timer 113, the AND gate 112 drives a flip-flop 115, of conventional construction and operation, into what may be termed the set condition. If any answer signal having a proper tone component is received subsequent to the ring enable timer 113 running out, there is no time overlap in the two input signals to the AND gate 112 and the flip-flop 115 is not set. The flip-flop 115 when set develops a first or answer control signal for placing an impedance termination across the lines of the base station telephone 10 to automatically answer the telephone.

For the particular arrangement being described, electromechanical means in the form of the paddle 200, a solenoid 201 and a solenoid driver 116 are employed for effecting the automatic answering of the telephone 10. As previously indicated, the paddle 200 is initially in such a position as to depress the handset buttons **10*b*, 10*b*. As the handset 10*a* depresses switching element 8 in the direction of the solid arrow associated therewith, the pivot point 200*a* of paddle 200 rigidly affixed to switching element 8 moves downward as indicated by the solid arrow so that the paddle depresses the handset buttons 10*b*, 10*b*. Upon the development of the answer control signal by the flip-flop 115, the solenoid driver 116, connected to the output of the flip-flop, energizes the solenoid 201 which, in turn, pivots the paddle 200 about the pivot point 200*a* as indicated by the dotted arrows so as to raise the paddle off of the handset buttons 10*b*, 10*b* permitting the handset buttons to rise, thereby placing an impedance termination across the lines of the telephone. The base station telephone 10** has been now answered.

CONVERSATION BETWEEN THE PARTIES

The answer control signal developed by the flip-flop 115 is also supplied to an answer hang-up inhibit timer 117. The answer hang-up inhibit timer 117 may be an RC timing circuit of conventional design which serves to inhibit an AND gate 118 of conventional construction and operation for a short period of time from resetting the flip-flop 115 which would result in the telephone being hung up. When the handset buttons **10*b*, 10*b* rise, the hybrid circuit of the base station telephone 10 responds to close the telephone circuitry. This response of the hybrid circuit is similar to that which occurs when the calling party hangs up except for the response at the time the telephone circuitry opens. It will become apparent when the hanging up operation is described that the response of the hybrid circuit may be used to initiate the development of a control signal for hanging up the base station telephone 10. Since the response of the hybrid circuit to the rising of the handset buttons 10*b*, 10*b* can result in the telephone 10 being hung up prematurely, the answer hang-up inhibit timer 117** is provided to inhibit the effect of the handset buttons.

When the answer Schmitt trigger circuit 111 is set off in response to an output signal from the gate 108, indicating that a proper tone signal has been received, the output signal from the answer Schmitt trigger circuit 111 is also supplied to an answer VOX inhibit circuit 119. Answer VOX inhibit circuit 119, in turn, supplies an inhibit signal to the VOX detector amplifier 63 to disable the VOX processor 60 for so long as an answer signal is being received. Thus, the party at the remote station takes control of the system for as long as an answer signal having at least the coded component is being transmitted from the remote station. The output signal from the answer Schmitt trigger circuit 111 also is passed through a memory delay timer 120 to the answer VOX inhibit circuit 119 so as to hold the VOX processor 60 quiescent for a short period of time after the termination of an answer signal. This is to prevent the release action of the "push-to-talk" button 9 on the remote station unit 4 from being continuously circulated throughout the system. Such a transition in the remote station unit 4 would be received by the base station unit 3 and be coupled to the mouthpiece **10*e*. Because of the feedback intentionally built into telephone handsets, this transition could be coupled to the earpiece 10*d* and out to the speech sensing and processing apparatus. The effect would be similar to the sensing of incoming speech to the base station telephone. The memory delay timer 120** may be an RC timing circuit of conventional design.

The answer control signal from the flip-flop 115 is also supplied to the hung-up VOX inhibit circuit 121 and a hung-up RCV audio inhibit circuit 122. These two inhibit circuits function to normally close off the transmitter and receive channels, respectively, when the system is hung up. By supplying the answer control signal to these two inhibit circuits the inhibiting effects are removed and the respective channels are held open for communication.

The telephone extension system is now conditioned to provide a link between the base station and the remote station thereby permitting the calling party at the far end of the telephone line and the called party at the remote station to converse with each other. Accordingly, means are provided for developing a speech signal representative of the speech of the incoming call. Such means may include a second pickup device, designated as a speech pickup 12, which may be either an electromagnetic or electrostatic pickup. For the present embodiment of the invention, the speech pickup 12 is an electromagnetic pickup which is placed in close proximity to the receptacle 6 (FIGS. 1, 2 and 3) which receives the earpiece **10*d* of the telephone handset 10*a*. Speech pickup 12 responds to the flux field of the loudspeaker in the earpiece 10*d* and develops a signal which is coupled to the band-pass filter 31 and the compression amplifier 32 where compression takes place in the usual manner. The compressed signal at the output of the compression amplifier 32, having its origin at the speech pickup 12, will from this point on be referred to as the speech signal. The speech signal is transmitted to the remote station by the Transmitter 40 and antenna 19** and processed by the VOX channel in the same manner as was the ring signal.

Upon reception of an answer signal, the signal at the output of the detector 57 of Receiver 50 contains two components: the tone signal and the speech modulation. The tone signal is coupled to the Coding Analyzer 70 and is analyzed in the manner described above. The speech modulation is coupled to a Speech Control Circuitry 80 which includes a speech bandpass filter 81, an audio switch 82 and an amplifier 83, all of conventional construction and operation. The speech bandpass filter 81 passes the speech modulation and rejects the tone signal. The Speech Control Circuitry 80 serves to couple the speech modulation to a loudspeaker 202. The audio switch 82 is designed to be initially inoperative in coupling any signal to the loudspeaker 202. When the answer Schmitt trigger circuit 111 develops an output signal indicating the reception of a proper tone signal, an inverter circuit 123 of conventional construction and operation and a click filter 124 coupled in cascade to the answer Schmitt trigger circuit 111 develop a control signal which renders the audio switch 82 operative and permits the speech modulation to be coupled to the loudspeaker 202. The hung up RCV audio inhibit circuit 122, responsive to the answer control signal from flip-flop 115, does not inhibit the development of the control signal for the audio switch 82 at this time. The click filter 124 may be a conventional RC filter which supresses the clicks generated as the "push-to-talk" button 9 on the remote station unit 4 is depressed and released.

The loudspeaker 202 is acoustically coupled to the mouthpiece 10*e* of the telephone handset 10*a* through a suitable acoustic coupler 203 such as the one illustrated in FIGS. 8*a*, 8*b* and 8*c* and to be described in more detail below. In this manner, the speech of the party at the remote station is coupled to the telephone handset 10*a* so as to put the called party at the remote station in communication with the calling party.

As previously indicated, when the answer Schmitt trigger circuit 111 is set off, the answer VOX inhibit circuit 119 inhibits the VOX processor 60. Under these conditions, the party at the remote station takes control of the system. When the VOX Schmitt trigger circuit 65 is set off in response to either the ringing or speech of an incoming call, the T/R switch driver and VOX inverter 105 conditions the VOX answer inhibit circuit 110 to inhibit the gate 108. Thus, the system is such that the party talking can maintain control. However, as soon as the calling party pauses, either between words or sentences, the transmitting apparatus is turned off and the receiving apparatus is conditioned for reception. This means that the party at the remote station by simply transmitting a carrier modulated by a tone signal only can take over control during a pause by the calling party and maintain this control.

TERMINATING THE CALL

After the conversation is over and the incoming call is terminated, the calling party at the far end of the telephone line hangs up his telephone. Any one of three effects created after the calling telephone is hung up may be utilized to initiate the development of a control signal for hanging up the base station telephone 10. These three effect are the transition resulting from the hanging up of the calling telephone, the transition resulting from the start of the dial-tone generated by the telephone equipment at some prescribed time after the hang-up of the calling telephone and the transition resulting from the start of the warning tone generated by the telephone equipment at some prescribed time after the initiation of the dial-tone. For the embodiment of the invention being described, any one of these transitions is effective to hang-up the base station telephone 10 and preferably the system is arranged to be responsive to all three effects if necessary.

Because it is desirable to hang-up the base station telephone 10 as soon as possible after the incoming calls been terminated so that the telephone can receive another incoming call and not be rendered inoperative longer than necessary, the transition resulting from the hanging up of the calling telephone is utilized to hang-up the base station telephone 10. This effect is also employed where the telephone system into which the calling telephone is connected does not generate a dial-tone or a warning tone after the calling telephone has been hung up. The need for the response to the transition at the start of the generation of the dial-tone and the warning tone arises where the signal from the calling telephone fades out gradually or is of insufficient amplitude. This may be due to the fact that the telephone system into which the calling telephone is connected does not provide a defined transition after the calling party hangs up or may be the result after very long distance calls, such as transcontinental or transoceanic calls. Where not all of the three effects are available to hang-up the base station telephone 10 or those that are available are ineffective, means may be provided for effecting a hang-up which are not dependent upon the hanging up of the calling telephone. This will be described in more detail below.

The hang-up transitions are sensed by a third pickup device, designated as a hang-up pickup 13 which may be an electrostatic or an electromagnetic pickup. The speech pickup 12 may, alternatively, be employed in the hang-up function as will be described hereinafter. For the present embodiment of the invention the hang-up pickup 13 is an electromagnetic pickup which is placed in close proximity to the flux field of the hybrid network of the base station telephone 10. The signal developed by the hang-up pickup 13, shown in waveform (d) in FIG. 6, is coupled to the Ring And Hang-Up Processing Circuitry 20 which responds in the same way as when the ring of an incoming call was sensed by the ring pickup 11.

The output signal from the Ring And Hang-Up Processing Circuitry 20 sets off the Schmitt trigger circuit 101 which, in turn, provides a signal to one input of the AND gate 118 through an OR gate 131 of conventional construction and operation. By this time, the inhibit signal from the answer hang-up inhibit timer 117 is no longer present to inhibit the AND gate 118 so that the AND gate 118 drives the flip-flop 115 into the reset condition. At this time, the flip-flop 115 develops another control signal which corresponds to the output of the flip-flop prior to being set so that the solenoid driver 116 no longer drives the solenoid. This causes the paddle 200 to pivot about pivot point 200*a* in a direction opposite to the dotted arrows so as to depress the handset buttons 10*b*, 10*b* and remove the impedance termination from the telephone lines. In this way, the telephone 10 is hung up.

The output of flip-flop 115 is also supplied to a hang-up answer inhibit timer 125 which through an inhibit circuit 126 prevents the ring enable timer 113 from being set off by the sensing of the depression of the handset buttons 10*b*, 10 *b* and the development of a signal by the Schmitt trigger circuit 101 in response thereto. As the handset buttons 10*b*, 10*b* are depressed, the hybrid circuit of the base station telephone 10 responds to open the telephone circuit. The response of the hybrid circuit is sensed by all three of the pickups 11, 12 and 13. The Ring And Hang-Up Processing Circuitry 20 responds as if a ring were sensed and would, in the absence of the hang-up answer inhibit timer 125 and the inhibit circuit 126, set off the ring enable timer 113. If a tone signal was still being received and the ring enable timer was set off, the flip-flop 115 would again be set and the base station telephone would not be hung up. The hang-up answer inhibit timer 125 may be an RC timing circuit of conventional design.

The output of the flip-flop 115 is also supplied to the hung-up RCV audio inhibit 122, and the hung-up VOX inhibit 121. These circuits, in response to the signal from the flip-flop 115, close off the receiver and the VOX channels, respectively.

THE REMOTE TRANSCEIVER

FIG. 4 is a block diagram of the remote station unit. This unit includes a Receiver 310 having an RF amplifier 311, a mixer 312, a first IF amplifier 313, a second IF amplifier 314, and a detector 314, all of conventional construction and operation and arranged in the usual manner. The remote station unit also includes a Transmitter 320 having a class C RF amplifier 321, a bank of T/R crystal selectors 322, and an RF oscillator 323, all of conventional construction and operation and arranged in the usual manner. The remote station unit is normally conditioned for receiving signals transmitted from the base station unit and may be switched to the transmitting mode when an operator at the remote station desires to transmit an answer signal to the base station. Accordingly, a plurality of conventional T/R switches 301 through 304, inclusive, are provided. These T/R switches condition the Receiver 310 to be normally on and the Transmitter 320 to be normally off.

Upon the reception of a signal transmitted from the base station unit, the signal is coupled from the antenna 300 through T/R switch 301 to the RF amplifier 311 in Receiver 310. T/R switch 302 provides mixer 312 with the proper mixing frequency from the RF oscillator 323 which, in turn, is controlled by the bank of T/R crystal selectors 322. The received signal is processed in the usual manner and the detected signal appears at the output of detector 315. T/R switch 304 is initially conditioned to couple the detected signal to an audio amplifier 305 which amplifies the detected signal and supplies it to the loudspeaker portion of the combination microphone-loudspeaker 306 through T/R switch 303.

When the operator at the remote station unit wishes to respond and pushes the "push-to-talk" button 9, the T/R switches 301 through 304, inclusive are reversed so as to permit the transmission of an answer signal. In particular, the coded component of the answer signal is developed from an encoding tone oscillator 307 which generates the proper tone frequency. The encoding tone oscillator 307 may be a conventional RC audio oscillator. The tone signal is coupled through T/R switch 303 to the Transmitter 320. The class C RF amplifier 321 is provided with the proper carrier frequency from the RF oscillator 323 since the output of the RF oscillator is now coupled to the class C RF amplifier through T/R switch 302. When the operator at the remote station speaks into the microphone-loudspeaker 306, the signal developed by the microphone is coupled to a conventional compressor 308 where the signal is compressed for the usual reasons. The compressed signal is coupled through T/R switch 304 to the audio amplifier 305, and, in turn, to the Transmitter 320 through the T/R switch 303.

The output of the class C RF amplifier 321, a carrier signal modulated by the tone frequency and by speech modulation representative of the voice of the operator, is coupled through T/R switch 301 to antenna 300. This answer signal is transmitted to the base station and is processed in the manner described above.

AUTOMATIC CALL TERMINATION

In the block diagram of FIGS. 5*a* and 5*b*, there are shown six additional blocks connected into the system by means of dotted lines. Five of these blocks, designated as a hang-up safety timer inhibit 127, a time scaler 128, an inhibit circuit 130, a switch 133 and a gate circuit 114 of conventional construction and operation provide the aforementioned alternate means for hanging up the base station telephone 10 so as not to depend solely upon the calling party hanging up. Such a facility is desirable in the event that a malfunction occurs in the telephone equipment of the calling telephone which would prevent the hanging up of the base station telephone 10. When these five circuits are included in the system, the connection between the T/R switch driver and VOX inverter 105 and the ring enable timer 113 is broken. Instead, the output signal from the T/R switch driver and VOX inverter 105 is supplied to the hang-up safety timer inhibit circuit 127. The sixth additional block, designated as a filter network 129, provides the aforementioned alternate means for sensing the transition as the calling telephone is hung-up by the speech pickup 12 instead of the hang-up pickup 13.

The ring enable timer 113 also serves as a timing circuit which insures that the base station telephone 10 will be hung up a prescribed time after the termination of both the answer signal and the incoming call. In this function the ring enable timer is controlled by the hang-up safety timer inhibit circuit 127 and is reset by either of two signals. One resetting signal is the output signal from the answer schmitt trigger circuit 111 which is supplied through the gate circuit 114 and which indicates the reception of the proper tone signal. The second resetting signal is the output signal of the T/R switch driver and VOX inverter 105 and particularly, the transitions in this signal due to either a pause in the speech of the calling party or the resumption of speech by the calling party. In the absence of a resetting signal within a prescribed period of time being coupled through the hang-up safety timer inhibit circuit 127, the ring enable timer 113 develops a signal which is supplied to AND gate 118 through OR gate 131. This signal has the same effect as an output signal from the Schmitt trigger circuit 101 developed in response to the sensing of the transitions from the calling telephone being hung up. Since the answer hang-up inhibit timer 117 no longer inhibits the AND gate 118, the AND gate 118 resets the flip-flop 115 resulting in the hanging up of the base station telephone 10. Thus, the base station telephone 10 is hung up whenever the ring enable timer 113 is not reset by either of the resetting signals within a prescribed period of time.

FIG. 7 is a generalized waveform diagram as seen at the output of the ring enable timer 113 showing the manner in which the control function of the hang-up safety timer inhibit circuit 127 operates. The first three vertical rises in the waveform indicate resettings of the hang-up safety timing by signals from the hang-up safety timer inhibit circuit 127, while the decays indicate rundowns toward a runout of the timing function. After answer and while the called party is transmitting, as represented by the first horizontal portion of the waveform, the ring enable timer 113 is reset by the output signal from the answer Schmitt trigger circuit 111. The next resetting of the ring enable timer 113 is due to a transition in the output signal of the T/R switch driver and VOX inverter 105. The two resettings may be distinguished in that the output signal from the answer Schmitt trigger circuit 111 is continuous for a continuous reception of the proper tone signal so that the ring enable timer 113 is continuously reset. This is the reason for the horizontal portion of the waveform following the answer and prior to the initiation of the decay. The duration of the horizontal portion corresponds to the time during which the tone signal is received and particularly to the time over which the party at the remote station is speaking. On the other hand, the resetting of the ring enable timer 113 by a transition in the output signal of the T/R switch driver and VOX inverter 105 is not continuous so that the rundown commences immediately after the resetting. In order for the calling party to speak indefinitely he must pause for a sufficient period of time so that the T/R switch driver and VOX inverter 105 switches from one state to the other and then for the calling party to resume speaking. This is indicated by the second, third and fourth resettings and the rundowns between these resettings. The last rundown illustrates a complete runout of the ring enable timer 113 and the hung-up step at the runout represents the signal which is supplied from the ring enable timer 113 to hang up the telephone 10.

The time scaler 128 controls the timing rundowns of the ring enable timer 113. As will be brought out in more detail in connection with FIGS. 9 and 10, the time scaler 128 causes the ring enable timer 113 to have one time constant for determining the time over which an answer from the remote station may be received after the transmission of a ring signal in order for the base station telephone to be answered and a second time constant for determining the time during which the ring enable timer must receive a resetting signal in order to prevent the hanging up of the base station telephone.

If calls are not to be initiated from the remote station, but the "push-to-talk" button 9 is inadvertently pushed without any incoming call to the base station unit 3, the base station unit would, in the absence of the gate 114, the inhibit circuit 130 and the switch 133, respond to the tone signal generated when button 9 is pushed. This would be due to the ring enable timer 113 being reset by the answer Schmitt trigger circuit 111 responding to the reception of the tone signal. In order to prevent this from occurring, the switch 133 is closed so that the inhibit circuit 130 closes the gate circuit 114, thereby preventing signals from the answer Schmitt trigger circuit 111 from resetting the ring enable timer 113. Only after the flip-flop 115 is set, signifying an answer signal after an initial transmission form the base station unit, is the inhibiting effect of inhibit circuit 130 removed permitting output signals from the answer Schmitt trigger circuit 111 to pass through the gate circuit 114 to reset the ring enable timer 113. This control of the inhibit circuit 130 is effected by coupling the answer control signal from the flip-flop 115 through the switch 133 to the inhibit circuit 130.

Where the remote station unit 4 is provided with means to initiate a call, the switch 133 is kept open so that the gate circuit 114 is not closed by the inhibit circuit 130 and signals from the answer Schmitt trigger circuit 111 are not inhibited. Thus, the ring enable timer 113 responds to the hang-up safety timer inhibit circuit 127 in the manner described above regardless from where the call is initiated. If the call is initiated at the remote station unit 4, the answer Schmitt trigger circuit 111, in response to the tone signal, provides one input to the AND gate 112 and a resetting signal to the ring enable timer 113. The ring enable timer 113 provides a second input to the AND gate 112 and the AND gate sets the flip-flop 115 to answer the base station telephone 10.

Two modes of operation are contemplated in providing the system with means for initiating calls at the remote station. In one, the remote station unit is provided with a dialing device so that the party at the remote station actually dials his own call. In the second, the party at the remote station arouses an operator at a switchboard into which his base station telephone is connected and the switchboard operator places the call. The switchboard operator is aroused when the handset is lifted off the handset buttons in response to the transmission and reception of a tone signal.

The filter network 129 is connected between the speech pickup 12 and the Ring and Hang-Up Processing Circuitry 20. At the conclusion of the conversation and when the calling telephone is hung up, the transition accompanying the clicking noise of the calling telephone being hung up is sensed by the speech pickup 12. Speech pickup 12, in turn, develops a signal such as the one shown in waveform (e) of FIG. 6 in response to this clicking noise. This signal is coupled to the Ring And Hang-Up Processing Circuitry 20 through the filter network 129 and is processed in the same manner as was the signal developed by the hang-up pickup 13 and is effective in the same manner in hanging up the base station telephone. The filter network 129 may be a conventional RC filter.

The inhibit circuits 121, 109, 110, 119, 122, 126, 127 and 130 may all be of conventional construction and operation.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

We claim:

1. A telephone extension system providing for conversation between a telephone caller using the telephone lines to a telephone subscriber at a remote station from his telephone base station comprising, means for developing a ring signal in response to the ringing of an incoming call to said base station telephone from a distant telephone, a speech signal representative of the speech from said distant telephone, a speech signal representative of the speech from said distant telephone and hang-up signal after the termination of speech from said distant telephone; base station transmitting and receiving means for transmitting said ring and speech signals to said remote station and for receiving signals transmitted from said remote station, said base station transmitting means including means for feeding speech signals from the telephone lines to the transmitter of said base station having a compression amplifier operatively associated therewith; remote station dialing means for generating dialing signals corresponding to the telephone number of said distant telephone; remote station transmitting and receiving means for receiving said signals transmitted from said base station and for transmitting a code signal and a speech modulation signal; means for modifying the frequency of said code signal in accordance with said dialing signal; and control means initially responsive to said code signal for placing an impedance termination across the lines of said base station telephone lines whereby said telephone number is dialed, said control means being responsive to said code signal subsequent to the answering of said distant telephone for maintaining an impedance termination across said base station telephone lines to couple the speech from said distant telephone to said base station transmitting and receiving means and for coupling the speech of said speech modulation signal to said base station telephone, said control means further being responsive to said hang-up signal for removing said impedance termination from said base station telephone lines after the termination of said speech from said distant telephone.

2. Apparatus as in claim 1 including a band-pass filter connected in the input to said compression amplifier.

3. Apparatus as in claim 1 in which the remote transmitter includes a microphone, and a speech compressor connected to said microphone.

UNITED STATES PATENT OFFICE
CERTIFICATE OF CORRECTION

Patent No. 3,557,312 Dated January 19, 1971

Inventor(s) Joseph Herbert Vogelman, Kenrick O. Stephenson, Jr, and Bernard Feinerman It is certified that error appears in the above-identified patent and that said Letters Patent are hereby corrected as shown below:

Column 14, lines 18 and 19, delete "a speech signal representative of the speech signal from said distant telephone"

line 20, insert--a--after "and".

Signed and sealed this 1st day of June 1971.

(SEAL)
Attest:

EDWARD M.FLETCHER,JR.
Attesting Officer

WILLIAM E. SCHUYLER, JR.
Commissioner of Patents